UNITED STATES PATENT OFFICE.

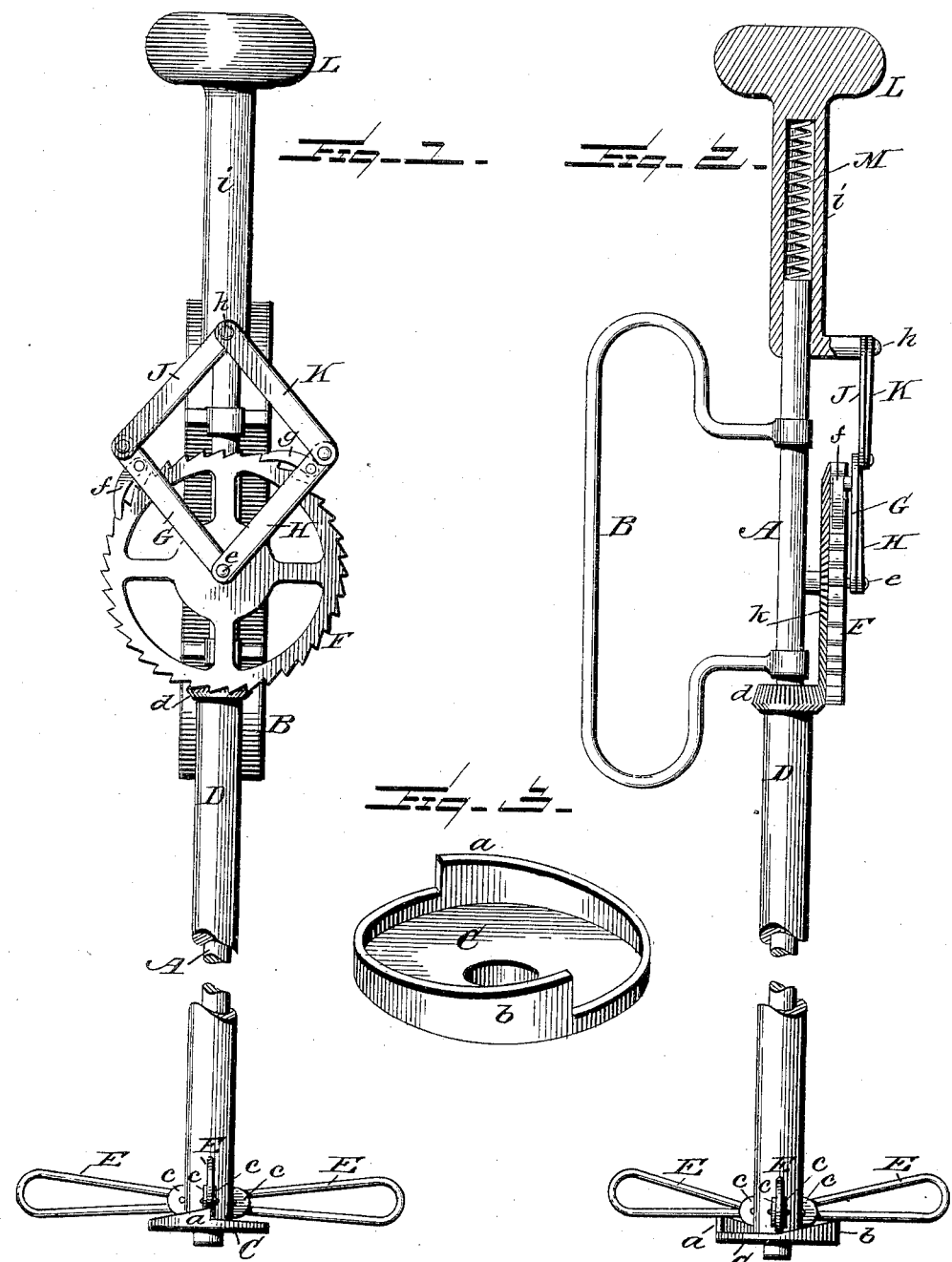

WALDEMAR HUGO SPANIER, OF DEVILS LAKE, NORTH DAKOTA.

BEATER OR MIXER.

SPECIFICATION forming part of Letters Patent No. 649,683, dated May 15, 1900.

Application filed March 8, 1900. Serial No. 7,814. (No model.)

*To all whom it may concern:*

Be it known that I, WALDEMAR HUGO SPANIER, a citizen of Sweden, residing at Devils Lake, in the county of Ramsey and State of North Dakota, have invented certain new and useful Improvements in Beaters or Mixers; and I do hereby declare that the following is a full, clear, and exact description of the same, reference being had to the annexed drawings, making a part of this specification, and to the letters of reference marked thereon.

The present invention has relation to that class of egg-beaters in which are employed rotatable wire beaters or agitators and suitable gearing for imparting motion thereto; and the invention consists in improving the beater in the several details of construction, whereby a more thorough and effective agitation and mixing of the liquid or semiliquid substances or compounds are attained, substantially as shown in the drawings and hereinafter described and claimed.

Figure 1 of the drawings is a front elevation of a beater or mixer constructed in accordance with my invention; Fig. 2, a side elevation thereof, partly in section; Fig. 3, a detail perspective view, on an enlarged scale, of the double cam-disk.

In the accompanying drawings, A represents a suitable rod, which is provided with a handle B of any desirable form and construction, and to the lower end of this rod is suitably connected a cam device of any desirable construction, but preferably in the form of a cam-disk C, as shown in detail in Fig. 3 of the drawings. In the present instance there are shown two cams $a\ b$ upon the disk C; but one or more cams may be provided, as found desirable, and the cams may be of any suitable form and construction.

A tubular shaft D encircles the rod A with suitable agitator-arms E, which may be of any preferred form and construction and extend radially from the tubular shaft and are suitably pivoted thereto. As a means of pivoting the agitator-arms I have shown one of many simple forms which may be employed, consisting of the ears or lugs $c$, projecting from the tubular shaft D, to which the inner ends of the agitator-arms are suitably pivoted. These agitator-arms E are brought successively in contact with the cams $a\ b$ as said arms are rotated by the rotation of the tubular shaft D. The upper end of the tubular shaft D is provided with a pinion $d$, with which engages a bevel-gear upon the inner side of a ratchet-wheel F, suitably mounted upon the end of a short bearing-pin $e$, so that it will readily revolve thereon. The bearing-pin $e$ forms a pivot-pin for the lower ends of the arms G H, which are provided with suitable dogs $f\ g$, engaging the ratchet-teeth on the periphery of the wheel F, as shown in Fig. 1 of the drawings. The lower ends of the levers J K are pivoted to the upper ends of the levers G H, and the former levers are loosely connected to a pivot-pin $h$, projecting from the lower end of a reciprocating handle L of any preferred construction. This handle has a tubular shank $i$, in which is located a spiral or other suitable spring M, which bears upon the upper end of the rod A, said rod entering the tubular shank a short distance, which rod forms a guide to the tubular shank when the handle L is depressed or on its return movement. When the handle L is depressed, the dog $f$ will force the ratchet-wheel F a certain distance, and through the medium of the pinion $d$, engaging with the gear $k$, the tubular shaft D will be moved upon its axis. As pressure is removed from the handle L the spring M will force the handle upward to its normal position, and in so doing the dog $g$, engaging with the ratchet-teeth of the wheel F, will force said wheel around a certain distance. The two dogs together, which engage to act alternately upon the ratchet-wheel, will impart to the tubular shaft D and the agitator-arms E a continuous rotary motion by the reciprocating motion of the handle L. As this continuous rotary motion is imparted to the radial agitator-arms by the means herein described a second motion is imparted to said arms in conjunction therewith, consisting of a waving or undulatory motion. This motion is attained by the cam or cams $a\ b$ on the disk C, the arms E being brought successively in contact therewith, and when riding over the incline of the cam said incline will gradually raise the pivoted agitator-arm until it passes over the highest point of the incline, when the arm will drop to its normal position to be again acted upon. It will therefore be seen that a compound motion is imparted to the agitator-arms—viz., a continuous rotary motion and a continuous undulating motion—which will effectively and thoroughly agitate the liquid or semiliquid substances and is especially adapted to the mixing of refreshing beverages where it is necessary that the ingredients should be satisfactorily united and blended. So far as this undulating motion of the agitator-arms is concerned the particular means shown and described for imparting to said arms a continuous rotary motion is not essential, as any means may be substituted that will give to the arms a rotary motion, and any convenient means may be employed for imparting to the agitator-arms the undulating motion herein described, and the agitator-arms may be changed in form and construction as found best adapted to the purpose, and any such changes in the details of construction may be resorted to without affecting the essential features of the invention.

Having now fully described my invention, what I claim as new, and desire to secure by Letters Patent, is—

1. A beater or mixer for liquids or semiliquids or compounds, consisting of a rotatable tubular shaft and suitable agitator-arms pivoted thereto, and a rod extending through the tubular shaft and a suitable cam device upon the lower end thereof for imparting to the agitator-arms an undulating motion during their rotation, substantially as and for the purpose set forth.

2. A beater or mixer for liquids or semiliquids or compounds, consisting of a tubular shaft provided at its lower end with agitator-arms, a rod extending into or through the shaft, a reciprocating handle engaging the upper end of the rod which acts as a guide therefor, and suitable mechanism connecting the handle with the tubular shaft by which said shaft is given a rotary motion by the reciprocating action of the handle, substantially as and for the purpose described.

3. A beater or mixer for liquids or semiliquids or compounds, consisting of a tubular shaft and beater-arms pivoted to the lower end thereof, a rod extending through the shaft and a suitable cam device upon the lower end thereof, a reciprocating handle engaging the upper end of the rod, and suitable mechanism connecting the handle with the tubular shaft by which said shaft is rotated, substantially as and for the purpose set forth.

4. A beater or mixer for liquids or semiliquids or compounds, consisting of a rotatable shaft, pivoted agitator-arms upon the lower end thereof, and a cam device for imparting an undulating motion to the agitator-arms, comprising a disk with inclined ways extending up from the periphery of the disk over which ride the agitator-arms during their rotation, substantially as and for the purpose described.

5. A beater or mixer for liquids or semiliquids or compounds, consisting of a tubular shaft having pivoted agitator-arms, a rod extending through the shaft and provided with a cam device at its lower end, a suitable stationary handle connected to the rod, a pinion upon the upper end of the tubular shaft, and a rotatable ratchet-wheel provided with a bevel-gear upon its inner side to engage the pinion, and suitable means for operating the ratchet-wheel, substantially as and for the purpose specified.

6. A beater or mixer for liquids or semiliquids or compounds, consisting of a tubular shaft provided at its lower end with agitator-arms, a rod extending through the tubular shaft, a reciprocating handle engaging the upper end of the rod, a ratchet-wheel engaging the upper end of the tubular shaft by suitable gearing, and a plurality of arms pivoted together and to the reciprocating handle and to the bearing or pin supporting the ratchet-wheel, said arms being provided with dogs for engaging the ratchet-teeth on the wheel successively upon the downward and upward stroke of the reciprocating handle, substantially as and for the purpose set forth.

7. A beater or mixer for liquids or semiliquids or compounds, consisting of a tubular shaft with suitable agitator-arms at its lower end, means for imparting to the arms an undulating motion during their rotation, a rod extending through the tubular shaft, a suitable handle connected to the rod below its upper end, a handle provided with a tubular shank engaging the upper end of the rod, a suitable spring located in the tubular shank, and a suitable driving mechanism connecting the reciprocating handle with the tubular shaft by which motion is imparted to the shaft by the action of the handle, substantially as and for the purpose set forth.

In testimony that I claim the above I have hereunto subscribed my name in the presence of two witnesses.

WALDEMAR HUGO SPANIER.

Witnesses:
 EDWARD F. FLYNN,
 R. T. TANNING.